Patented Oct. 19, 1954

2,692,212

UNITED STATES PATENT OFFICE 2,692,212

MANUFACTURE OF DRY SURFACE CONTACT RECTIFIERS

Alexander Jenkins and Leslie Hurst Peter, London, England, assignors to Westinghouse Brake and Signal Company Limited, London, England No Drawing. Application January 19, 1951, Serial No. 206,911

Claims priority, application Great Britain February 9, 1950

1 Claim. (Cl. 117—118)

This invention relates to the manufacture of dry surface contact rectifiers and has for its object to provide improved rectifiers of this character which will withstand comparatively high operating temperatures.

The field of application of known forms of dry surface contact rectifier, such as the selenium and copper oxide rectifiers, is limited by their high negative temperature-resistance coefficients and by their increased rate of ageing at high temperatures. These characteristics cause a decrease in the reverse resistance of the rectifier and an increase in its forward resistance.

The heat resisting properties of ceramic materials composed of titanium dioxide together with various proportions of other metallic oxides have long been known and such mixtures are extensively used in the manufacture of insulating ceramic bodies for condensers. It is also known that, by appropriate heat treatments, such ceramic materials can be converted to a semiconducting state. Asymmetric devices have been produced comprising a body of semi-conducting titanium dioxide, sometimes referred to as "blue" titanium dioxide, having silver electrodes volatilised on to opposite surfaces, one of which made direct contact with the silver whilst the other had a thin film of an insulating compound such as silica between it and the other silver electrode. This device had rectifying ratios up to 100:1, but its resistance in the low resistance direction of current flow was too high for the device to be of commercial use. Later a rectifier was produced comprising an iron plate on which was a layer of titanium dioxide on top of which was applied a silver counter electrode. This rectifier, however, was found to age badly and to be expensive to produce.

The devisers of the present invention have discovered that there appears to be a limited number of metals from which to select the necessary counter-electrode material for use in a titanium dioxide rectifier and that a certain treatment of the semi-conductor surface to which the counter-electrode is to be applied is advisable if not essential.

It is believed that the heating of titanium dioxide material in a reducing atmosphere to convert it to its semi-conducting state produces a chemical condition throughout the body which is deficient in oxygen in relation to the stoichiometric composition of titanium dioxide, and that, for successful rectification to take place, this oxygen deficiency must be made good at the surface to which the counter-electrode is applied. Another way of explaining this conversion is to say that the partial reduction of the titanium dioxide from its stoichiometric non-conducting form to its non-stoichiometric semi-conducting form results in the formation of "impurity centres" of free titanium atoms distributed through the body and that, to produce a good rectifier, it is necessary to oxidise these impurity centres at the surface or to remove them, so that the body has a thin surface layer composed of titanium dioxide of stoichiometric composition which is a part of the original body rather than an extra layer applied to that surface.

"Making good the oxygen deficiency" is intended to include both the restoring of the oxygen to the non-stoichiometric crystalline structure at the surface of the semi-conductor and also the removal of the excess titanium atoms from the crystalline structure at that surface, so that there is left a thin surface layer of titanium dioxide of stoichiometric composition without the so-called impurity centres of titanium metal.

By the term "excess titanium atoms" is meant atoms of titanium which are associated with less than the stoichiometric proportion of oxygen and may under suitable chemical conditions be detached from the original body of titanium dioxide.

According to the invention, a process for the manufacture of a dry surface contact rectifier comprises the steps of treating a surface of a semi-conducting body composed wholly or mainly of titanium-dioxide of non-stoichiometric composition so as to make good the oxygen deficiency in that surface and applying to that surface a counter-electrode composed wholly or mainly of a metal selected from the group composed of thallium, tellurium, gold, palladium, lead, bismuth, silver, cadmium, nickel, copper, tin, alkali metals, arsenic, antimony, carbon, cobalt, gallium, indium, iron, or alloys thereof.

Preferably the treatment includes the application of heat.

Preferably the counter-electrode is composed of thallium, tellurium, gold, palladium, lead, bismuth, or alloys thereof.

There are several methods of making good the oxygen deficiency at the surface layer of the semi-conducting titanium material and it has been found that, besides the usual and well known oxidising agents, other oxygen bearing compounds may be used, although not usually classified as oxidising agents in the sense in which that term is normally used in chemistry.

A number of alternative methods will now be described.

A wafer composed wholly or mainly of titanium dioxide which has been heated in a reducing atmosphere in known manner to convert it to its semi-conducting form is heated to a red heat in a neutral atmosphere and is then plunged rapidly into oxygen, air, ozone, nitrogen peroxide or any other gaseous oxidising agent. Care has to be taken that the cooling of the wafer in this gas is not spread over too long a period or the whole of the semi-conducting wafer will return to its insulating form throughout.

By a "neutral atmosphere" is meant an atmosphere which neither adds to nor subtracts from the oxygen component of substances undergoing heat treatment therein.

Alternatively, the surface of the wafer may be treated with nitric acid or aqua regia and subsequently dried at a temperature of about 100° C. or heated rapidly to about 400° C. to 500° C. It is believed that excess titanium atoms, or impurity centres, in the surface of the material are at first dissolved and then, during the drying, deposited on that surface as titanium dioxide from which oxygen enters the surface. Another explanation of this reaction is that each titanium atom associated with vacant oxygen points in the surface accepts oxygen atoms without moving out of the crystalline structure; in this case the oxygen atoms derived from the acid fill up the vacant oxygen points in the surface of the material to convert that surface into a barrier layer of titanium dioxide of stoichiometric composition. It is envisaged that in the first explanation above, the nitric acid may dissolve out the impurity centres of excess titanium atoms in the surface and convert them to metatitanic acid which decomposes, upon being raised to a temperature of 400–500° C., into titanium dioxide and water vapour. When the nitric acid reacts with the excess titanium atoms in this manner to form metatitanic acid, nitrogen peroxide is also produced and it is probable that this supplies some of the oxygen which enters the crystalline structure. It is found that aqua regia produces rather better results than nitric acid alone.

A further method of making good the oxygen deficiency is to treat the surface of the wafer with a halogen acid. Of these acids, hydrofluoric acid is found to be most effective and may be employed in the same manner as nitric acid as described above.

Sulphuric acid may be employed. This acid when applied to the surface of the wafer acts with the excess titanium atoms to form titanium sulphate which, upon heating to a red heat, decomposes and forms titanium dioxide at the surface, upon which the counter-electrode is applied after cooling. Both the heating and the cooling are carried out in a non-oxidising atmosphere.

Common oxidising agents such as hydrogen peroxide or sodium peroxide in aqueous solution may also be employed, as may an acid solution of potassium dichromate or potassium permanganate.

It is considered that all of the above mentioned treatments result in the absorption into a thin surface layer of the oxygen deficient semi-conducting titanium-dioxide material of oxygen derived from the oxygen bearing compound applied to that surface, the degree of absorption depending upon the composition of the compound and the temperature at which the treatment is carried out. That this is so is strongly supported by the fact that rectifiers made by processes incorporating these treatments are found to withstand high mechanical pressures which would be expected to break down any artificial, external barrier layer formed on top of the surface of the titanium dioxide material.

It may be remarked that any of the above mentioned chemical treatments of the surface of the wafer may be carried out in an atmosphere from which air has been excluded except, of course, when air is used as a source of oxygen.

It should also be noted that the above treatments must be limited in duration in order to prevent too deep a penetration of the oxygen. Suitable times are found to range up to five minutes.

Having thus described our invention, what we claim is:

A process for the manufacture of a dry surface contact rectifier including the steps of applying sulphuric acid to the surface of a semi-conducting body composed at least mainly of titanium dioxide of non-stoichiometric composition, heating said body to a red heat in a neutral atmosphere, and cooling in a neutral atmosphere.

References Cited in the file of this patent

UNITED STATES PATENTS

| Number | Name | Date |
|---|---|---|
| 1,995,200 | Cubitt et al. | Mar. 19, 1935 |
| 2,060,905 | Smith | Nov. 17, 1936 |
| 2,162,362 | Smith | June 13, 1939 |
| 2,444,473 | Skinker | July 6, 1948 |
| 2,452,603 | Saslaw | Nov. 2, 1948 |

OTHER REFERENCES

Electronic Engineering (October 1946), pp. 313–315.

Metal Rectifiers, Henisch (1949), pp. 127–130.